United States Patent [19]

Jaklin

[11] Patent Number: 5,395,658

[45] Date of Patent: Mar. 7, 1995

[54] FROST DE-ICING SALT-RESISTANCE OF CONCRETE CONSTRUCTIONS

[76] Inventor: Hans Jaklin, Erlenhof, Aacherweg 15, D-5500 Trier, Germany

[21] Appl. No.: 74,335

[22] Filed: Jun. 10, 1993

[30] Foreign Application Priority Data

Jun. 10, 1992 [DE] Germany .................. 42 19 034.7

[51] Int. Cl.$^6$ .............................................. B05D 3/02
[52] U.S. Cl. ............................ 427/397.8; 106/286.7; 106/287.1; 106/287.34; 252/70; 423/332
[58] Field of Search ............ 106/286.7, 287.1, 287.34; 252/70; 423/332; 427/397.8

[56] References Cited

U.S. PATENT DOCUMENTS

| | | | |
|---|---|---|---|
| 2,988,423 | 6/1961 | McDaniel | 423/332 |
| 4,347,285 | 8/1982 | Batdorf | 427/397.8 X |
| 5,165,958 | 11/1992 | Plaisted et al. | 427/397.8 X |
| 5,275,752 | 1/1994 | Hansen | 252/70 |

*Primary Examiner*—Michael Lusignan

[57] ABSTRACT

The frost-de-icing salt-resistance of concrete structures is improved by applying to the surface of the concrete an aqueous alkali silicate solution comprising

| | |
|---|---|
| slilicic acid (calculated as $SiO_2$) | 30–32 moles |
| alkali metal ions (calculated as $Na^{+1}$) | 23–24.3 moles |
| $C_1$–$C_3$ alcohol (calculated as ethanol) | 2–2.1 moles |
| carbonate (calculated as $CO_3^{-2}$) | 1.6–2.1 moles |
| water         at least | 400 moles. |

11 Claims, No Drawings

FROST DE-ICING SALT-RESISTANCE OF CONCRETE CONSTRUCTIONS

BACKGROUND OF THE INVENTION

1. Field of the invention

The invention relates to the improvement of the frost-de-icing salt-resistance of concrete constructions.

2. Brief Description of the Prior Art

Solidified concrete and mortar always contain a fine capillary pore system formed in the cement paste by hydration and which promotes the water condensation in the constructed body. Due to the capillary system, water is also directly absorbed from atmospheric moisture and not only in liquid form as dew or precipitation.

For a specific pore distribution, the amount of condensate depends on the relative air humidity of the atmosphere.

The maximum depth of water penetration is usually less than 3 cm in all properly manufactured concretes having a water/cement value (W/C) of not more than 0.6.

Beside the gel pores of from 1.5 to 3 nm, with a water content—designated as "solid water"—which can be expelled only at high temperatures, and the capillary pores of from 1 to 10 $\mu$m (measured according to Brownyard, T. L., Proc. ACI 43, 1947, 101-132), larger pores and fissures occur in the surface area, depending on the composition of the mixture and on the production quality.

The liquid water which penetrates into the surface layers is converted into the lighter ice, having a density of from 0.88 to 0.92 g/ml, and expands by about 11%. Although part of the water, e.g. that which is present in the narrower capillaries, may still be liquid at, e.g. $-10°$ C., as a result of the lowering of the vapor pressure, the water freezes in the so-called water pocketes, the inner water puddles, water pores and cracks and exerts a strong pressure on the concrete body. The expansion due to the pressure of the ice outweighs the contraction by the cooling-off. If the water is converted into ice also in the narrower capillaries, the change of length may amount to 1 to 2 mm/m at $-20°$ C. However, a concrete which has once been damaged for the first time by freezing cannot revert to its initial condition upon thawing due to the resulting more open inner structure, in particular An the surface area.

The effect of air pores (AP) on concrete was discovered by chance in 1940 in the USA. At first, the occasional good freezing behaviour of concretes was assigned to some specific types of cements. The cements which seemed to be frost-resistant "by nature" were contaminated by a slight amount of lubrication oil which acted as air pores agent (AP agent). (Dyckerhoff, H., ZKG 1, 1948, 93-95).

If 16% AP are present in a concrete, an expansion is not observed when the length is measured during the alternation of frost and thawing but a shrinkage at $-20°$ C. amounting to a some tenths mm/m, whereas the same condition is achieved during thawing, i.e. a change relative to the initial condition does not occur. With 8-10% AP, the cement stone does not change its length between $+20°$ C. and $-20°$ C. (according to T. C. Powers).

The effect of the air pores in the solidified cement paste is based on the fact that they are not filled with water when the concrete becomes wet and are available as volume reserve during the expanding freezing of the capillary and crack water and prevent the hydraulic and ice pressure. Ice and water can escape into the air pores. The size of the AP which exhibit an antifreezing effect is between 0.1 and 2 mm. According to the statements of other authors, the diameter of the AP should not exceed 0.2 mm. The content should be between 4 and 5% and the maximum distance between the air pores 0.25 mm to provide enough auxiliary and quickly accessible room if ice is formed spontaneously, The positive influence of the air pores on the frost-thaw behaviour is counteracted by a negative influence on the strength characteristics. According to K. Walz (DAfStb. H. 123, 1956), the bending strength is reduced by 2 to 3% for each % of incorporated air and the tensile strenght by 3 to 4%. If one departs from each of the maximum values, which is advisable by way of precaution, a bending strength reduced by 15% and a tensile strength reduced by 20% result form the necessary 5% AP content.

A further advantage of the LP technique is the relatively great variable of the amount to be used. An amount ranging from 0.5 to 2 g/kg cement are recommended. The difficulty of providing the proper dosage of AP agent resides in that the need for AP agents increases with the fineness of the cement, for example from 3000 to 5000 cm$^2$/g specific surface, to about the double amount, Water-soluble alkalies of the cement promote the AP formation and the organic substances (0.015%) which are present in all technical cements can increase or reduce the need.

The amount of AP agent determined by preliminary tests must be added in exact amounts when the mixing takes place. In view of the dosage of between 0.5 to 2 g/1000 g cement, this requires due care which is not guaranteed under construction conditions with added amounts of between 0.05 to 0.2%, already small differences, based on the absolute amounts, can have a very strong effect on the quality of the concrete.

The formation of an optimum AP structure additionally depends on the amount and quality of the aggregates. The grain size distribution within the aggregates and in particular the fine grain proportion have here the strongest influence on the size and distribution of the air pores in the Concrete.

It is obvious that the frost damages in road surfaces and landing grounds of airports are constantly increasing although these concretes have been made with the help of AP agents. The most important reasons are the following:

As already described above, it is likely that one has not succeeded so far in creating the optimum AP arrangement and AP size distribution. In practice, it is not the frost-thaw-interaction resistance which is decicive but almost exclusively the effect of de-icing salt during the frost-thaw alternation, to put it briefly, the frost-de-icing salt resistance.

In the winter of 1978/79, about 3 kg salt/m$^2$ were spread on the highways of the Federal Republic of Germany. The attack on the concrete surface and shortly thereafter on the steel reinforcement is additionally effected by salt solutions of high concentration up to saturated solutions.

If an icy road is thawed by spreading salt, a so-called freezing mixture consisting of salt and ice is first formed, causing a sudden drop of the temperature of the surface layer. In practice, this is called a cold shock.

The salt concentration of the melt water rises during daytime, in particular under the influence of solar radiation, due to the evaporation of water. After sunset, there is a drop in temperature and the solubility for the salt decreases and is further diminished if part of the water is converted into ice, which again increases the salt concentration. The salt crystallization reduces the available pore volume for the expansion of ice and consequently increases the pressure in the concrete surface system. The hydrate formation of the de-icing salts causes a further rise of the inner pressure, all the more since the surface layer is covered with ice and hinders the escape of water and salt. NaCl and NaCl.2H$_2$O are at equilibrium in the same amount already at temperatures of about zero degree (exactly at ±0.15° C.).

Attempts have been made to hydrophobize a thusly damaged concrete with silanes, siloxanes or polysiloxanes to protect its surface and the steel reinforcement. However, this has not been satisfactory, because the chemical resistance of hydrophobizations is insufficient.

In particular the reactions of the cement-bonded and lime-bonded building materials are important. These substances form new reaction products, even after years, said reactions taking place preferably at the inner surface. New non-hydrophobic surfaces are formed thereby and surfactants adhering to the inner wall of the pores are incorporated into the new reaction products and thus become ineffective.

The second aspect is the reactivity of the building materials vis-à-vis surrounding substances. Due to the carbonatization of alkaline building materials, the pH-value of the pore solution and the composition of the inner surfaces change, which may result in a desorption of the hydropnobizing agent.

A further problem encountered in hydrophobization is the fact that hydrophobized building materials cannot be treated a second time since the hydrophobizing agent (in general) cannot penetrate into already treated pores. Second coats are, therefore, not recommendable in case of impregnations. Redevelopments of formerly hydrophobized constructed bodies are likewise problematic.

The hydrophobization of concrete having steel reinforcement is usually detrimental to the corrosion prevention of the built-in steel. The carbonatization reduces the alkalinity of the concrete and consequently the inhibition of the steel surface. Since the pore openings are not obstructed by liquid water, carbon dioxide, atmospheric oxygen and water vapor can penetrate forward into damaged concrete without any impediment until they reach the iron. A slight adhering moisture on the reinforcement is enough to start and continue the corrosion of the steel.

Thus, there existed the necessity for providing a sufficient frost-de-icing salt resistance to new concrete constructions and for making old buildings likewise resistant to frost and de-icing salts and for additionally protecting the reinforcement against corrosion.

SUMMARY OF THE INVENTION

These problems are solved by the present invention by using an aqueous alkali silicate solution which has been modified by lower alcohols and carbonate ions. 10 kg of this solution have approximately the following composition:

| | | |
|---|---|---|
| silicic acid | calculated as SiO$_2$ | 30–32 moles |
| alkali metal ions | calculated as Na$^{+1}$ | 23–24.3 moles |
| C$_1$–C$_3$-alcohol | calculated as ethanol | 2–2.1 moles |
| carbonate | calculated as CO$_3^{-2}$ | 1.6–2.1 moles |
| water | calculated as at least | 400 moles |

The alkali metal ions are preferably present as sodium or potassium ions. The solution has a viscosity of 10–12 mPa.sec. Ethanol is the preferred alcohol.

DETAILED DESCRIPTION OF THE INVENTION AND PREFERRED EMBODIMENTS

The application of the solution is simple and needs little expenditure of work. The concrete surface which is designed to be protected must be freed from foreign matter, loose dirt and rubbed-off concrete merely by sweeping. Strong sweeping and sand blasting are not necessary. Moreover, the concrete surface needs not be dry. Only water puddles, dead or flowing water have to be removed or drained.

Three coatings with increasing concentration are advantageous and can be applied by conventional coating techniques. The initial solution is diluted with water for the first coating in the ratio of 1 part by volume solution: 3 parts by volume water. This means that in this case there are about 1200 moles of water for the specified mole amounts of silicic acid, alkali metal ions, alcohol and carbonate.

The dilution is less for the second coating: the ratio is 1 part by volume solution: 2 parts by volume water and the dilution for the third coating is 1:1. The waiting times between the coatings depend on the meteorological conditions and are usually only a few hours. An application without dilution with water is also possible, in particular if a strongly damaged concrete surface is involved.

The applied amounts depend on the condition of the concrete. They are in the range of more than 100 g/m$^2$ concrete surface and preferably mount to between 100 and 300 g/m$^2$ concrete surface and in exceptional cases even more.

Concrete constructions which can be treated according to the invention are mainly concrete buildings having iron or steel reinforcement, such as roads, highways, bridges and their crowns, car parks, runways of airports and in general concrete constructions which suffer under the burden of de-icing salt.

EXAMPLE

The efficiency of the use of the modified alkali silicate solution was examined using concrete sample bodies. They were tested after three coatings with increasing concentration, as described above, together with non-treated comparative samples according to the ÖNORM 3306.

In order to simulate two different degrees of damage of the concrete surface, concrete sample bodies having the dimensions 20×20×7 cm, of strength class B 45 and standard DIN 1045 and a particle size distribution curve A/B8 of the aggregate with a maximum grain size of 8 mm in the region between the two limit particle size distribution curves A8 and B8 were pretreated at their test surface by sand blasting or by a wire brush prior to the treatment with the solution.

The treatment was conducted with a solution having the composition:

| Silicic acid | calculated as $SiO_2$ | 31 moles |
| --- | --- | --- |
| $Na^{+1}$ ions | | 23.6 moles |
| ethanol | | 2.1 moles |
| carbonate | calculated as $CO_3^{-2}$ | 1.9 moles |
| water | | 420 moles |

The sand blasted surface (variant A) used 223.8 g initial solution/m² concrete surface, the brushed surface (variant B) used 163.8 g initial solution/m² concrete solution.

After the expiration of 50 cycles, the coated surfaces did not show any change, i.e. frost damages did not occur, neither weathering nor any loss of weight. The conditions required by the ÖNORM 3306 (max. 50 g weight loss) were fulfilled by all the concrete test bodies impregnated with the solution. The uncoated comparative samples were taken away from the test after 40 cycles because they already exhibited great damages. The weatherings were measured as follows: Variant A, untreated: 511.25 g loss/m² concrete surface Variant B, untreated: 734.25 g loss/m².

I claim:

1. A method for improving the frost-de-icing salt resistance of concrete structures comprising applying to the surface of a concrete structure an alkali silicate solution comprising:

| slilicic acid (calculated as $SiO_2$) | | 30–32 moles |
| --- | --- | --- |
| alkali metal ions (calculated as $Na^{+1}$) | | 23–24.3 moles |
| $C_1$–$C_3$ alcohol (calculated as ethanol) | | 2–2.1 moles |
| carbonate (calculated as $CO_3^{-2}$) | | 1.6–2.1 moles |
| water | at least | 400 moles. |

2. A method for improving the frost-de-icing salt resistance of concrete structures according to claim 1 wherein the amount of said alkali silicate solution applied to said surface of said concrete structure is greater than 100 grams per square meter of said surface.

3. A method according to claim 2 wherein the amount of said alkali silicate solution applied to said surface is from 100 to 300 grams per square meter of said surface.

4. A method according to claim 2 wherein said method of treatment is carried out not earlier than 28 days after the concrete is poured.

5. A method according to claim 3 wherein said method of treatment is carried out not earlier than 28 days after the concrete is poured.

6. An aqueous alkali silicate composition for treatment of concrete to improve its frost-de-icing salt resistance comprising:

| silicic acid (calculated as $SiO_2$) | 30–32 moles |
| --- | --- |
| alkali metal ions (calculated as $Na^{+1}$) | 23–24.3 moles |
| $C_1$–$C_3$ alcohol (calculated as ethanol) | 2–2.1 moles |
| carbonate (calculated as $CO_3^{-2}$) | 1.6–2.1 moles |
| water | 400–1200 moles |

7. A method for improving the frost-de-icing salt resistance of concrete structures comprising applying to the surface of a concrete structure the alkali silicate solution of claim 6.

8. A method for improving the frost-de-icing salt resistance of concrete structures according to claim 7 wherein the amount of said alkali silicate solution applied to said surface of said concrete structure is greater than 100 grams per square meter of said surface.

9. The method according to claim 8 wherein the amount of said alkali silicate solution applied to said surface of said concrete structure is from 100 to 300 grams per square meter of said surface.

10. The method of claim 8 wherein said method of treatment is carried out not earlier than 28 days after the concrete is poured.

11. The method of claim 9 wherein said method of treatment is carried out not earlier than 28 days after the concrete is poured.

* * * * *